US006798925B1

(12) United States Patent
Wagman (10) Patent No.: US 6,798,925 B1
(45) Date of Patent: Sep. 28, 2004

(54) METHOD AND APPARATUS FOR CALIBRATING AN IMAGE ACQUISITION SYSTEM

(75) Inventor: Adam Wagman, Framingham, MA (US)

(73) Assignee: Cognex Corporation, Narick, MA (US)

( * ) Notice: Subject to any disclaimer, the term of this patent is extended or adjusted under 35 U.S.C. 154(b) by 622 days.

(21) Appl. No.: 09/747,874

(22) Filed: Dec. 22, 2000

(51) Int. Cl.$^7$ .............................. G06K 9/36; G06K 9/00; G01B 11/14
(52) U.S. Cl. ..................... 382/287; 382/151; 356/620
(58) Field of Search ..................... 382/296, 141, 382/159, 181, 287, 142, 143, 145, 147, 148, 149, 151, 152; 356/614–616, 620, 625

(56) References Cited

U.S. PATENT DOCUMENTS

| | | | | |
|---|---|---|---|---|
| 4,753,569 A | * | 6/1988 | Pryor .......................... | 700/250 |
| 5,083,073 A | * | 1/1992 | Kato .......................... | 700/259 |
| 5,329,469 A | * | 7/1994 | Watanabe .................... | 700/259 |
| 5,960,125 A | * | 9/1999 | Michael et al. ............. | 382/294 |
| 6,219,442 B1 | * | 4/2001 | Harper et al. ............... | 382/141 |
| 6,301,396 B1 | * | 10/2001 | Michael et al. ............. | 382/294 |
| 6,356,343 B1 | * | 3/2002 | Shiraishi et al. ............. | 355/77 |
| 6,362,004 B1 | * | 3/2002 | Noblett ........................ | 436/43 |
| 6,424,734 B1 | * | 7/2002 | Roberts et al. ............. | 382/151 |
| 6,490,369 B1 | * | 12/2002 | Beiman ....................... | 382/153 |
| 6,535,291 B1 | * | 3/2003 | Skunes et al. .............. | 356/614 |

* cited by examiner

*Primary Examiner*—Jon Chang
*Assistant Examiner*—Wesley Tucker
(74) *Attorney, Agent, or Firm*—Paul Kudirka; Russ Weinzimmer (57) ABSTRACT

A single fiducial mark with at least one characteristic of known value is placed on one or more objects that are examined by a machine vision system. Alternatively, a pre-existing object feature that has a known characteristic can be used. An image acquisition system can be calibrated by examining the objects with a vision tool that can align objects with translation and at least one additional degree of freedom and that can measure the value of the characteristic. In general, information measured by the vision tool can be used to infer similar information concerning the calibration. For example, in one embodiment, the single fiducial mark has a precise dimension and the vision tool can measure the dimension in order to calibrate the scale of the system. In another embodiment, each object to be examined is held in a predetermined position by a fixture on the materials handling system and a fiducial mark is placed on each object. The image acquisition may be calibrated by examining each object, examining objects periodically, or examining objects in another pattern, such as randomly or examining selected objects.

39 Claims, 5 Drawing Sheets

METHOD AND APPARATUS FOR CALIBRATING AN IMAGE ACQUISITION SYSTEM

FIELD OF THE INVENTION

This invention relates to image acquisition systems for object location and inspection and, more particularly, to techniques for calibrating the optical system in an image acquisition system.

BACKGROUND OF THE INVENTION

In many applications, it is necessary to determine the two-dimensional location or translation and angular orientation of an object of interest. Depending on the application, a determination of one or more of these properties is called determining the "alignment" of an object. In some applications, alignment also may include additional degrees of freedom, such as scale, aspect, shear or even various types of non-linear deformations. For example, in a robotic assembly system, it may be necessary to determine the alignment of a printed circuit board so that a robotic arm can place an integrated circuit onto the board at a precise location. One way to perform this alignment is to mechanically constrain the board at a predetermined location and angular orientation. Guides, brackets and many other well-known mechanical arrangements can be used to accomplish this alignment. However, in other applications, it is not feasible to mechanically constrain each object. In these latter systems, machine vision systems are often used to determine the alignment of objects.

Machine vision systems acquire images of an environment, process the images to detect objects and features in the images and then analyze the processed images to determine characteristics of objects and other features detected in the images. The system generally includes a camera/frame grabber system that generates an image that consists of a plurality of digitized image pixels. The image pixels are then processed with an algorithm implemented in software and/or hardware typically called a vision "tool."

In order for the machine vision system to operate with other equipment, such as a materials handing system or a robotic assembly arm, the output of the machine vision system must converted into a frame of reference that can be used to control the materials handing system. For example, the output of the machine vision system is typically expressed in pixel dimensions, since the underlying image is composed of pixels. The output in pixels must be converted into other metrics, such as millimeters or inches, which can be used to control the materials handing system. Further, it is necessary to convert the output of the machine vision system so that a given point in the image corresponds to a known point in the frame of reference in which the handling system is located and to which the handing system can move.

Conventionally, this conversion is performed in connection with a process called "calibration." In order to calibrate a machine vision system, a special calibration target, or calibration plate, is mechanically fixed in a known position with respect to the frame of reference. The calibration target includes objects that are located at predetermined points and spaced apart at known distances. In addition, a unique "fiducial" mark may be included in order to determine absolute position. The machine vision system then acquires images of the calibration plate objects and the fiducial mark. Since the spacing of the objects is known, the output of the machine vision system in pixels can be directly converted into the necessary metrics for controlling the materials handing portion of the system. The position of the fiducial mark, as determined by the machine vision system, can be used to determine the position of the calibration plate with respect to the frame of reference.

The calibration operation not only permits the necessary conversions, but also can be used to compensate for various distortions introduced by the optical path of the machine vision system. For example, the image acquisition camera may be mounted so that the resulting image is rotated with respect to the frame of reference. Distortions in size, shape, position and aspect ratio of objects may be introduced by the other components of the image acquisition optical system. Since the spacing of the calibration objects are known and the position of the fiducial mark is known, during the calibration process the output of the image acquisition system can be adjusted accordingly in order to remove these distortions.

The manner of determining the alignment of the calibration objects depends on the type of vision tool used to locate the objects. Some tools can tolerate variations in size, shape and angular orientation during the location procedure, but have other deficiencies. For example, the earliest vision tool widely used for object location and inspection in industry was blob analysis. In this type of tool, image pixels are classified as object or background pixels by some means, the object pixels are joined to make discrete sub-objects using neighborhood connectivity rules, and various moments of the connected sub-objects are computed to determine object position, size, and orientation. Blob analysis tools can tolerate and measure variations in orientation and size.

However, such tools cannot tolerate the presence of various forms of image degradation. A more serious problem was that the only generally reliable method ever found for separating object pixels from background pixels was to arrange for the objects to be entirely brighter or entirely darker than the background. This requirement is difficult to achieve in other than the most controlled conditions, although it typically can be achieved if a specially manufactured calibration plate is used.

However, it is very desirable to eliminate the need for a special calibration plate and thus to overcome the limitations of blob analysis tools. In order to overcome such limitations, techniques called "template matching" tools were developed to locate objects based on their pattern rather than grayscale intensities. A template matching tool typically starts with a training step. In this step, a software representation called a pattern, or template, of an image or synthetic description of an ideal object is created and stored. At run-time, the template is moved in various positions over the digitized image and compared to like-sized pixel subsets of the image. The position where the best match between the template and image sub-set pixels occurs is taken to be the position of the object. Because a "search" is performed for the best match, this type of tool is often called a search tool. The degree of match (a numerical value) can be used for inspection, as can comparisons of individual pixels between the template and image at the position of best match.

The first template matching tools used a brightness threshold to reduce the pixels of the template and image to two states: "bright" and "dark." This reduced the computation necessary for the comparison operation to a reasonable level for the available computation facilities. Unfortunately, the thresholding step made sub-pixel accuracy impractical and made the results highly susceptible to the selection of the threshold and variations in illumination and object reflectivity.

Later tools overcame the thresholding problem by using a normalized correlation operation for the template and image comparison step, albeit at the cost of considerable additional computation. Normalized correlation template matching tools also overcame many of the limitations of blob analysis tools—they can tolerate touching or overlapping objects, they perform well in the presence of various forms of image degradation, and the normalized correlation match value is useful in some inspection applications. Most significantly, perhaps, in order for the tool to operate properly, objects need not be separated from background by brightness, enabling a much wider range of applications.

Unfortunately, while normalized correlation template matching tools work well in determining the location of objects that are translated, they will tolerate only small variations in angular orientation and size: typically a few degrees and a few percent (depending on the specific template). Even within this small range of orientation and size variation, the accuracy of the results falls off rapidly when the objects deviate from fixed sizes and orientations and such a system may not be able to distinguish between two objects that do not differ much in size.

Other search tools have been devised that can determine the alignment of objects in the presence of variations in one or more other characteristics or "degrees of freedom" in addition to translation. For example, such tools may be able to determine the alignment of objects in the presence of significant variations in translation and rotation, translation and size or translation and skew. Other tools can determine the alignment of objects in the presence of variations in multiple degrees of freedom, such as variations in translation, rotation and size. These tools can be used to locate objects in the presence of such variations.

For example, normalized correlation matching tools have been extended to tolerate variations in several degrees of freedom by using-multiple templates in the search. In order to accommodate objects that vary in size, a separate template for each object size is created and stored during the training process. Similarly, in order to accommodate objects that have been rotated, a separate template is created for each object that is rotated with a different degree of rotation.

However, with such tools, a separate pattern must be trained for each object size and each orientation of each object size, and then a search must be performed using each pattern over the entire runtime image. Each pattern occupies computer memory, and, depending on the techniques and the size or complexity of the training image or description, a typical pattern may occupy tens or hundreds of kilobytes or even several megabytes of memory. Aside from the training time required to create the patterns, a large number of patterns can easily consume large amounts of memory. If the patterns are stored in a central location and downloaded to local computers when needed, the network connecting the computers must have significant bandwidth. Further, the need to search the image with a large number of patterns increases the search time significantly. In addition, because patterns must be created for each size and rotation, the patterns are created in discrete steps and the accuracy of the system suffers.

Still other search tools use geometric feature matching to locate and determine the alignment of objects with variations in several degrees of freedom, such as translation, rotation and size. In these systems, a feature detection algorithm produces a geometric description of object boundaries. This geometric description comprises a set of boundary points that lie along contours separating dissimilar regions in the image. Each boundary point specifies both position and orientation. In this system, the training process uses a training pattern to select features to represent the object. Once the boundary points have been generated, they can be transformed by parameterized mathematical algorithms to produce translated, rotated, scaled, and stretched patterns. The pattern search is thereby reduced to searches over parameter values. An example of such a system is the PatMax® search tool developed and sold by Cognex Corporation, One Vision Drive, Natick, Mass.

Other vision tools are available that can locate and determine the alignment of objects with variations in several degrees of freedom. These vision tools include the HexSight® Locator machine vision system developed and sold by Adept Technology, Inc., San Jose, Calif. and SMART Search® machine vision system developed and sold by Imaging Technology, Inc., 55 Middlesex Turnpike, Bedford, Mass. 01730.

With proper vision tools, the calibration operation can be used to eliminate or reduce the effects of camera rotation and optical distortion in an image acquisition system. However, the process is time-consuming and cumbersome. The calibration plate must be carefully fixed in position on the materials conveyor or motion table and a special calibration process initiated. Such a calibration process may need to be repeated if the image acquisition system changes over time. In most cases, the processing of actual materials must be halted during the calibration process.

Therefore, there is a need for a method and apparatus for quickly and easily calibrating an image acquisition system.

SUMMARY OF THE INVENTION

In accordance with the principles of the present invention, a fiducial mark with at least one characteristic of known value is placed on one or more of the objects that are examined by the machine vision system. The image acquisition system can be calibrated by examining the objects with a vision tool that can align objects with translation and at least one additional degree of freedom and that can measure the value of the characteristic. In general, information measured by the vision tool can be used to infer similar information concerning the calibration. For example, in one embodiment, the single fiducial mark has a precise dimension and the vision tool can measure the dimension in order to calibrate the scale of the system.

In another embodiment, the object bearing the mark is held in a predetermined position in a mechanical fixture and the vision tool can be used to locate the mark. The outputs of the vision tool can then be used for both size conversion and position with respect to the frame of reference. In addition, if the vision tool can accurately align angular orientation, the outputs of the vision tool can be used to correct for rotation introduced by the optical system. Since the fiducial marks are placed on the objects that are being handled by the system, no special calibration plates or procedures are necessary.

In another embodiment, a normalized correlation search tool is used to locate the mark. The tool internally generates a set of rotated and scaled patterns that are then stored. The stored patterns are subsequently used to perform the search.

In still another embodiment, a normalized correlation search tool internally generates a set of rotated and scaled patterns at runtime when the search for the mark is being performed.

In yet another embodiment, each object to be examined is held in a predetermined position by a fixture on the materials handling system and a fiducial mark is placed on each object. The image acquisition may be calibrated by examining each object, examining objects periodically or examining objects in another pattern, such as randomly. Even if the objects are not fixtured, some recalibration (such as for pixel size alone) may be performed.

In still another embodiment, selected objects to be examined are held in a predetermined position on the materials handling system and a fiducial mark is placed on each object or only on the selected objects. The system may be calibrated by examining the selected objects.

BRIEF DESCRIPTION OF THE DRAWINGS

The above and further advantages of the invention may be better understood by referring to the following description in conjunction with the accompanying drawings in which.

DETAILED DESCRIPTION

Figure 1:
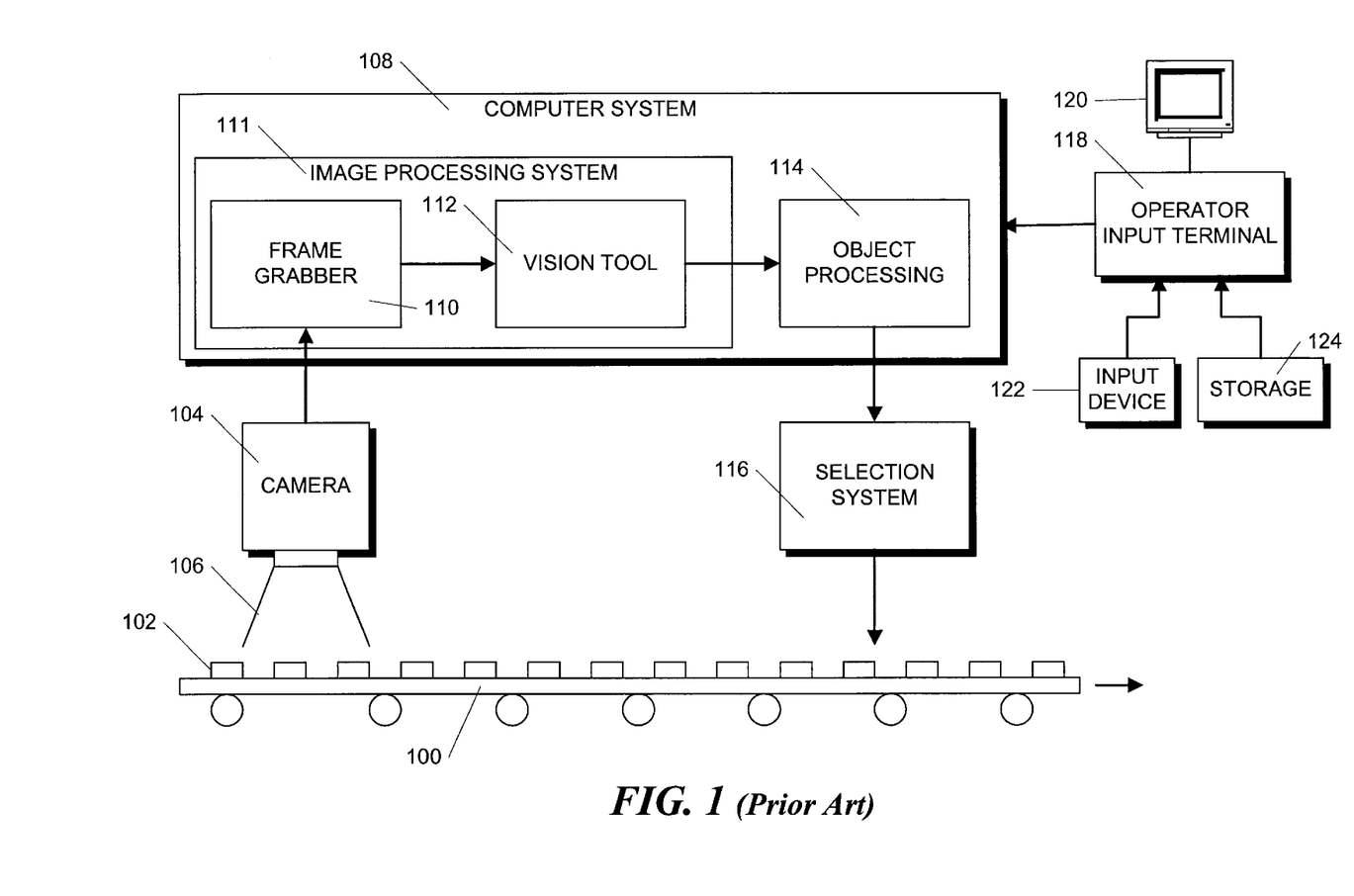
FIG. 1 is a schematic block diagram of a conventional machine vision system.

FIG. 1 illustrates in schematic form an example of a machine vision system that can utilize the process of the present invention. In the example system, a conveyor 100 moves to the right and carries objects 102 to be examined. The objects may also be presented to the system by other well-known mechanisms. As the objects pass on the conveyor 100, an image stream of the objects is created by a camera system 104 in a conventional manner. Camera 104 may have built in illumination as indicated schematically at 106 or a separate light source may be provided. The image stream created by the camera 104 is provided to computer system 108 which processes the image by comparing patterns in the image to a model pattern.

Figure 2:
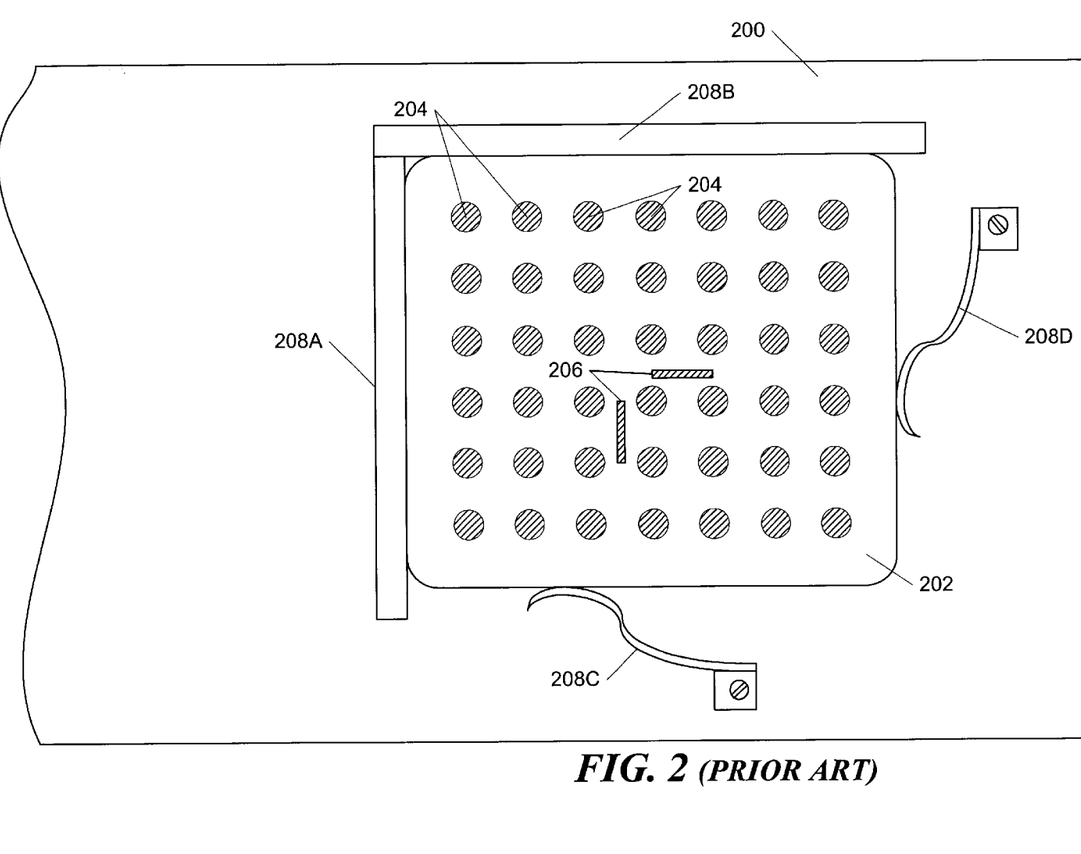
FIG. 2 is a schematic diagram illustrating a conventional calibration plate affixed to the materials handling system and used for calibrating the image acquisition system.

FIG. 2 shows a material conveyance system 200 that carries a calibration plate 202 that can be used to calibrate the image acquisition system. The calibration plate 202 has a plurality of calibration objects 204 that are spaced apart a precise, predetermined distance. The calibration plate 202 also bears a fiducial mark 206 that allows the location of the plate to be determined in the frame of reference. For example, in a conventional calibration plate, the fiducial mark might comprise two rectangles of known size as illustrated in FIG. 2. The calibration plate is mechanically fixed in position on the material conveyance system 200 by any suitable mechanism 208, such as rails, rollers, spring fingers or other mechanisms known to those skilled in the art.

During the calibration procedure, the plate 202 is affixed to the material conveyance system 200 and an image is acquired of the calibration objects 204 and the fiducial mark 206 using a machine vision system such as that shown in FIG. 1. Then, all of the calibration objects 204 are located and the positions fitted to a parametric description of the calibration. If the parametric description is just for scale, then only the conversion from pixels to a dimension, such as millimeters, would be determined. Typically, scale, angular orientation, aspect and shear are computed. It is also common to compute nonlinear distortion using a more complicated parametric description. In addition, the location of the fiducial mark 206, as determined by the machine vision system, can be compared to known location of the mark 206 on the calibration plate 202 and used to determine the position of the mark in the frame of reference from the machine vision system outputs.

The computer system 108 in general comprises an image processing system 111 and an object processing system 114. The image processing system, in turn, includes a frame grabber 110 that creates a series of fixed images from the image stream generated by camera 104. The series of fixed images are provided to a vision tool 112 that locates the calibration object and the fiducial mark in the image. In accordance with the principles of the present invention, the vision tool is a search tool that can process images with a degree of freedom in addition to translation and that uses a trained template to search the images for objects and fiducial marks as discussed below.

With some vision tools, the location and angular orientation of the objects and fiducial marks with respect to a fixed coordinate system are produced directly by the vision tool. With other vision tools, the outputs of the tool must be processed further in a conventional manner to calculate the location and angular orientation of the objects and fiducial marks. Once the calibration objects and fiducial mark on a calibration plate have been located, further processing may be performed to align additional objects for processing. The object alignments are then used to control a selection or manipulation system 116. The selection and manipulation system treats each object 102 based on the results of the object processing 114.

In preparation for processing, an operator first "trains" the system to establish a model template or pattern via the operator input terminal 118. This training may be performed in several manners. For example, an image containing objects may be presented to the operator on a display 120 associated with terminal 118. The operator can then select an object of interest by "drawing" a box around the object using an input device 122 or by other suitable means. Once the object has been selected, the computer system 108 may use the object image as the pattern. Alternatively, after an object is selected, additional processing may be performed in order to sharpen edges, simplify the image, etc. Instead of selecting a portion of an image, an operator can enter parameters that describe an ideal image model, such as by providing CAD information.

Figure 3:
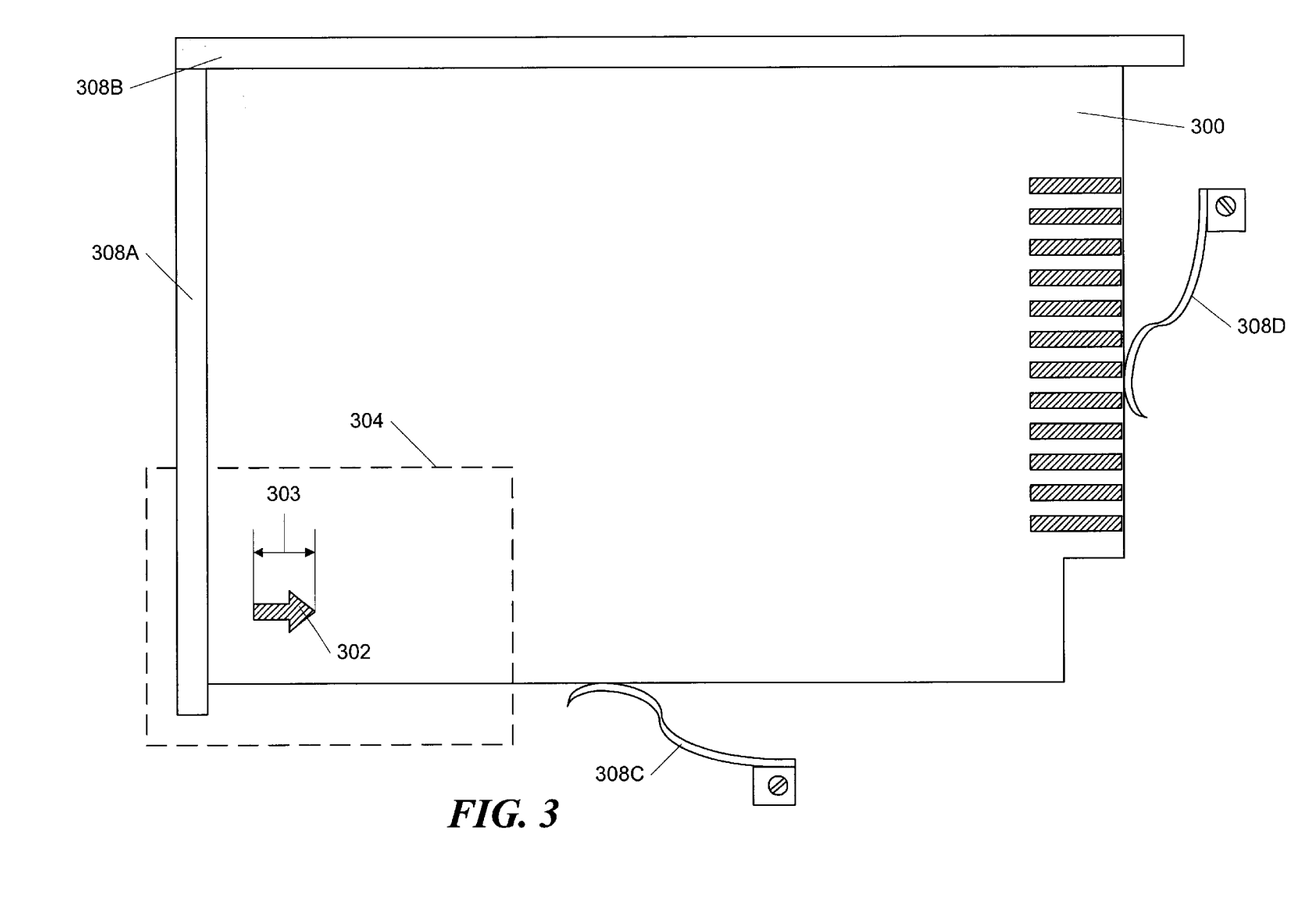
FIG. 3 is a diagram illustrating a method of placing a single non-rotationally symmetric fiducial mark on an object for calibration purposes.

FIG. 3 illustrates the calibration of an image acquisition system using only one fiducial mark on an object to be processed, such as a printed circuit board 300, in accordance with the principles of the invention. In this arrangement, at least one object to be processed, such as printed circuit board 300, is marked with a single non-rotationally symmetric mark 302. Mark 302 is placed on the board 300 in a predetermined location and with a predetermined angular position with respect to the board 300. The fiducial mark 302 has at least one characteristic of known value 303 that is precise. As shown in FIG. 3, mark 302 is enlarged for clarity. Although the mark is shown as an "arrow" shape various other marks could be used as long as the shape does not exhibit rotational symmetry.

In a preferred embodiment, the fiducial mark is a Universal Alignment Target, which is a class of target specially designed for use with machine vision systems, as described in co-pending U.S. patent application Ser. No. 09/699,614, filed Oct. 30, 2000, which application is hereby incorporated in its entirety by reference. Those skilled in the art will understand that marks with limited rotational symmetry—such as squares, rectangles and hexagons—may be used in some applications where angular orientation will vary over a limited range or need not be determined uniquely. Alternatively, if a unique non-rotationally symmetric feature occurs naturally on the object, that feature may be used instead of a fiducial mark. Some vision tools can be programmed to search the object for such a feature. As with the conventional calibration plate, the board 300 may be fixed to the materials conveyance system in a known position and orientation by suitable means 308A–D.

In operation, the horizontal and vertical edges of the board can be detected by means of a light beam and photocell arrangement, mechanical feelers or any other well-known arrangement. Once the board 300 is approximately located, the vision tool is instructed to examine an area such as area 304 in order to locate fiducial mark 302 with respect to the aforementioned frame of reference. However, once mark 302 is located, the vision tool can accurately determine the size of dimension 303 and the angular orientation of the mark 302 with respect to the frame of reference. These values can then be used to calibrate the image acquisition system.

Although only one object bearing a fiducial mark is needed to calibrate the image acquisition system, other arrangements offer additional advantages. For example, in system where each object to be examined is fixtured in a predetermined position on the materials handling system, a fiducial mark can be placed on each object. This allows the image acquisition system to be re-calibrated at will during the processing the objects. The system may be calibrated by examining each object in case very precise measurements must be made. The system may also be calibrated by examining objects periodically or examining objects in another pattern, such as randomly. Alternatively, the system may be calibrated when some other factor indicates that the original calibration is no longer valid. If, instead, the objects are not fixtured, it is still possible to perform a partial calibration, such as calibrating just the pixel size.

Alternatively, only selected ones of objects to be examined can held in a fixture on the materials handling system and a fiducial mark placed on each object or only on the selected objects. The system can then be calibrated by examining only the selected objects.

Figure 4A:
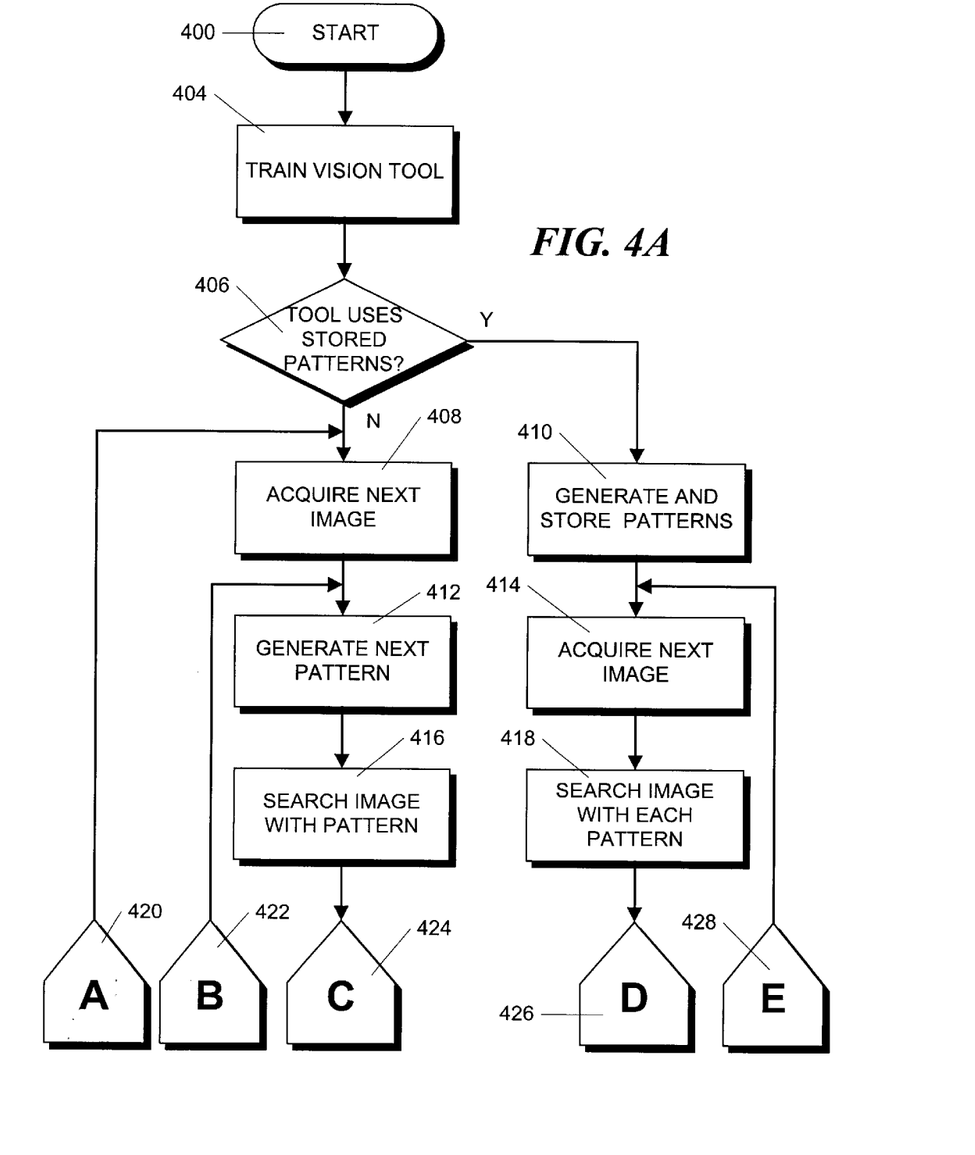
FIGS. 4A and 4B, when placed together, form a flowchart illustrating the steps in a process of determining the alignment of the fiducial mark in accordance with the principles of the invention for calibration purposes.
Figure 4B:
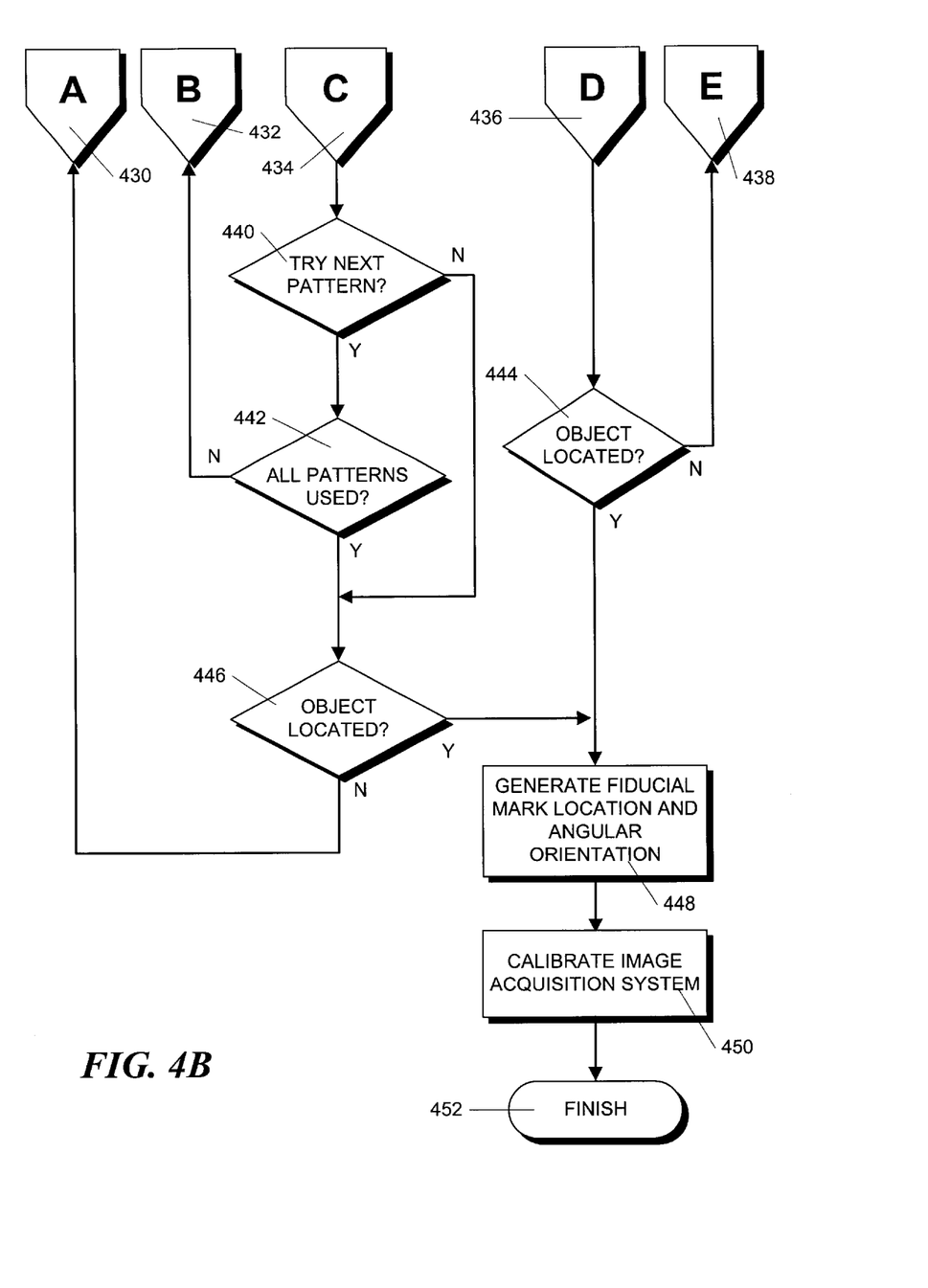

Example steps in an overall system for aligning a fiducial mark with a vision tool that can process variation in at least one degree of freedom in addition to translation are shown in FIGS. 4A and 4B. The process starts in step 400 and proceeds to step 404, where the vision tool is trained. This training would preferably take place using a training pattern that has a fixed relationship to the frame of reference. In step 406, a determination is made whether the vision tool requires multiple patterns that are pre-stored patterns. If it does, then the process proceeds to step 410 where the patterns are generated and stored. For example, the multiple patterns can be generated by transforming the pattern used for training.

Next, in step 414, an image of the environment is obtained as discussed above. Then, in step 418, the image is searched using the stored patterns. The process then proceeds, via off-page connectors 426 and 436, to step 444 where a determination is made whether an object, such as a fiducial mark, has been located. If not, the process proceeds, via off-page connectors 438 and 428, back to step 414 where another image of the environment is acquired. The system may take additional action (not shown) before returning to step 414 if no object was located.

Alternatively, if in step 444, a determination is made that the fiducial mark has been located, further processing generates values indicating the size of the predetermined dimension and the angular orientation with respect to the training pattern (which, as mentioned above, may itself have a predetermined relationship to the frame of reference) in step 448 and the process proceeds to step 450. In step 450, the values obtained in step 448 are used to calibrate the image acquisition system and the process terminates in step 452.

If, in step 406, it is determined that the vision tool does not use stored patterns, the process proceeds to step 408 where an image is acquired. Then, in step 412, the next search pattern is generated by transforming the training pattern. In step 416, this pattern is used to search the image.

The process then proceeds, via off-page connectors 424 and 434, to step 440 where a determination is made whether another pattern should be tried. This allows for variations in the search procedure. For example, in a tool that uses multiple patterns, after a first match is obtained, the tool may still try additional patterns before making a selection to determine whether a "better" match can be obtained. Alternatively, the search may terminate when the first match is obtained. Still other variations are possible, such as selecting further patterns to try based on a match obtained for a particular pattern. These variations and other search strategies would be known to those skilled in the art.

If a determination is made in step 440 that no further patterns will be tried, then the process proceeds to step 446 where it is determined whether an object has been located in the image. If so, the object location is generated in step 448. The process then proceeds to step 450 to locate other objects as discussed above.

If it is determined in step 440 that additional patterns will be tried, the process proceeds to step 442 where a determination is made whether all patterns have been used in the search. If not all patterns have been used, the process proceeds, via off-page connectors 432 and 422 back to step 412 where the next pattern is generated. Steps 416, 440, and 442 are then repeated until an object is located as determined in step 446. Alternatively, if, in step 442, a determination is made that all patterns have been used then the process proceeds to check whether an object has been located in step 446. If not, the process proceeds, via off-page connectors 430 and 420, back to step 408 where another image is obtained. The system may also take other action (not shown) before returning to step 408. The process then repeats.

A software implementation of the above-described embodiment may comprise a series of computer instructions either fixed on a tangible medium, such as a computer readable medium, e.g. a diskette, a CD-ROM, a ROM memory, or a fixed disk, or transmissible to a computer system, via a modem or other interface device over a medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, even if the object bearing the mark is not held in a predetermined position, the vision tool outputs can be used for other measurements, such as size conversion. Those skilled in the art will appreciate that there is a wide variety of possibilities. For example, knowing a great deal of information about the fiducial mark allows a great deal of information to be inferred about the calibration. However, even though only a small amount of information is known about the fiducial mark, some limited inferences can be made about the calibration. These inferences might include the fiducial size, orientation, or even a mathematical description of its shape, or any other information that might be useful. In addition, although only a few vision tools were explicitly discussed in the specification, those skilled in the art will appreciate that there are many other possible embodiments of a vision tool capable of aligning objects with at least one degree of freedom in addition to translation. Such embodiments include, but are not limited to, Fourier-based and wavelet-based approaches. Use of any embodiment of such a vision tool for the purposes described herein is within the spirit and scope of the invention. Other aspects, such as the specific instructions utilized to achieve a particular function, as well as other modifications to the inventive concept are intended to be covered by the appended claims.

What is claimed is:

1. A method for calibrating an image acquisition system with respect to a fixture frame of reference in a machine vision system that has a camera with an image frame of reference, the camera being for obtaining an image of an environment containing an object, the machine vision system having a vision tool capable of aligning location and at least one other non-translational degree of freedom, the method comprising:
   (a) placing a single non-rotationally symmetric fiducial mark having at least one precise dimension on the object at a predetermined location on the object and at a predetermined angular orientation with respect to the object;
   (b) maintaining a fixed translational and angular relationship between the object and the fixture frame of reference, the camera being stationary with respect to the fixture frame of reference;
   (c) using the vision tool to find the fiducial mark in the image so as to determine location and angular orientation of the fiducial mark with respect to the image frame of reference; and
   (d) using the fixed relationship indicated in step (b) and the location and angular orientation of the fiducial mark determined in step (c) to calibrate the image acquisition system so as to determine a relationship between measurements and coordinates in the image frame of reference with measurements and coordinates in the fixture frame of reference.

2. The method of claim 1 wherein the vision tool is a multiple pattern normalized correlation tool having a pattern for each object size, and each orientation of each object size.

3. The method of claim 1 wherein the vision tool is a geometrical pattern matching tool.

4. The method of claim 1 wherein step (c) comprises selecting an area of the object having a non-rotationally symmetric feature, and using the vision tool to find the selected area in the image instead of locating a fiducial mark.

5. The method of claim 1 wherein step (c) comprises determining the location and angular orientation of the fiducial mark directly from the outputs of the vision tool.

6. The method of claim 1 wherein step (c) comprises calculating the location and angular orientation of the fiducial mark from the outputs of the vision tool.

7. The method of claim 1 wherein step (b) comprises using a mechanical fixture to maintain a fixed translational and angular relationship between the object and the fixture frame of reference, the camera being stationary with respect to the fixture frame of reference.

8. The method of claim 1 further comprising:
   (e) placing a single fiducial mark having at lest one precise dimension on each object of a plurality of objects at respective predetermined locations on the objects.

9. The method of claim 8 further comprising:
   (f) maintaining a fixed translational and angular relationship between only some of the plurality of objects and the fixture frame of reference.

10. The method of claim 9 further comprising:
    (g) using the fiducial marks on the only some of the plurality of objects to re-calibrate the image acquisition system.

11. The method of claim 8 wherein fiducial mark is non-rotationally symmetric.

12. An apparatus for calibrating an image acquisition system with respect to a fixture frame of reference in a machine vision system that has a camera with an image frame of reference, the camera being for obtaining an image of an environment containing an object, the machine vision system having a vision tool capable of aligning location and at least one other non-translational degree of freedom, the apparatus comprising:
   single non-rotationally symmetric fiducial mark having at least one precise dimension placed on the object at a predetermined location on the object and at a predetermined angular orientation with respect to the object;
   a fixture for maintaining a fixed translational and angular relationship between the object and the fixture frame of reference, the camera being stationary with respect to the fixture frame of reference:
   an image processing system that uses the vision tool to find the fiducial mark in the image so as to determine location and angular orientation with respect to the image frame of reference; and
   a calibration system that uses the fixed relationship maintained by the fixture and the location and angular orientation of the fiducial mark determined by the image processing system to calibrate the image acquisition system so as to determine a relationship between measurements and coordinates in the image frame of reference with measurements and coordinates in the fixture frame of reference.

13. The apparatus of claim 12 wherein the vision tool is a multiple pattern normalized correlation tool having a pattern for each object size, and each orientation of each object size.

14. The apparatus of claim 12 wherein the vision tool is a geometrical pattern matching tool.

15. The apparatus of claim 12 wherein the image processing system comprises a mechanism for selecting an area of the object and wherein the vision tool finds the selected area in the image instead of finding a fiducial mark.

16. The apparatus of claim 12 wherein the image processing system comprises a mechanism that determines the location and angular orientation of the fiducial mark directly from the outputs of the vision tool.

17. The apparatus of claim 12 wherein the image processing system comprises a mechanism that calculates the location and angular orientation of the fiducial mark from the outputs of the vision tool.

18. The apparatus of claim 12 wherein the fixture comprises mechanical means to maintain a fixed translational and angular relationship between the object and the fixture frame of reference, the camera being stationary with respect to the fixture frame of reference.

19. The apparatus of claim 12 further comprising a single fiducial mark having at least one precise dimension located on each of a plurality of objects at respective predetermined locations on the objects.

20. The apparatus of claim 19 further comprising a plurality of fixtures for maintaining a fixed translational and angular relationship between at least some of the plurality of objects and the fixture frame of reference.

21. The apparatus of claim 20 further comprising a recalibration system that uses the fiducial marks on the at least some of the plurality of objects to re-calibrate the image acquisition system.

22. The apparatus of claim 19 wherein each fiducial mark is non-rotationally symmetric.

23. A method for calibrating an image acquisition system with respect to a fixture frame of reference in a machine vision system that has a camera with an image frame of reference, the camera being for obtaining an image of an environment containing an object, the camera being in stationary relationship with the object the machine vision system having a vision tool capable of aligning location and at least on other non-translational degree of freedom, the method comprising:

(a) electing a feature having at least one characteristic of known value on the object;

(b) using the vision tool to find the feature in the image so as to determine the value of the at least one characteristic with respect to the image frame of reference; and (c) using the value of the at least one characteristic to calibrate the image acquisition system so as to determine at least a relationship between pixel size in the image frame of reference with measurements in the fixture frame of reference.

24. The method of claim 23 wherein the feature is a fiducial mark placed on the object in order to calibrate the image acquisition system.

25. The method of claim 24 wherein the fiducial mark is non-rotationally symmetric.

26. The method of claim 23 wherein the feature is a pre-existing feature that naturally occurs on the object.

27. The method of claim 23 wherein the characteristic of known value is a precise dimension and the method calibrates a scale of the image acquisition system.

28. The method of claim 23 wherein the feature is not rotationally symmetric and the characteristic of known value is an angular orientation and the method calibrates an angular orientation of the image acquisition system.

29. The method of claim 23 wherein the feature is not rotationally symmetric and has at least two characteristics of known value including a precise dimension and an angular orientation and the method calibrates both a scale and an angular orientation of the image acquisition system.

30. The method of claim 23 wherein step (b) comprises using a mechanism for selecting an area of the object and then using the vision tool to find the selected area in the image instead of locating a fiducial mark.

31. An apparatus for calibrating an image acquisition system with respect to a fixture frame of reference in a machine vision system that has a camera with an image frame of reference, the camera being for obtaining an image of an environment containing as object, the camera being in stationary relationship with the object, the machine vision system having a vision tool capable of aligning location and at least one other non-translational degree of freedom, the apparatus comprising:

a mechanism that selects a feature having at least one characteristic of known value on the object;

a vision tool that finds the feature in the image so as to determine the value of the at least one characteristic with respect to the image frame of reference; and an object processing system that uses the value of the at least one characteristic to calibrate the image acquisition system so as to determine at least a relationship between pixel size in the image frame of reference with measurements in the fixture frame of reference.

32. The apparatus of claim 31 wherein the feature is a fiducial mark place on the object in order to calibrate the image acquisition system.

33. The apparatus of claim 32 wherein the fiducial mark is non-rotationally symmetric.

34. The apparatus of claim 31 wherein the feature is a pre-existing feature that naturally occurs on the object.

35. The apparatus of claim 31 wherein the characteristic of known value is a precise dimension ad the method calibrates a scale of the image acquisition system.

36. The apparatus of claim 31 wherein the feature is not rotational symmetric and the characteristic of known value is an angular orientation and the method calibrates an angular orientation of the image acquisition system.

37. The apparatus of claim 31 wherein the feature is not rotationally symmetric and has at least two characteristics of known value including a precise dimension and an angular orientation and the method calibrates both a scale and an angular orientation of the image acquisition system.

38. The apparatus of claim 31 wherein the vision tool is cooperative with a mechanism that selects an area of the object and wherein the vision tool searches for the selected area.

39. A machine vision system for calibrating an image acquisition system with respect to a fixture frame of reference, the machine vision system comprising:

a camera for obtaining an image of an environment containing an object, the object being in stationary relationship with the camera while the camera obtains an image of the object;

a vision tool capable of aligning location and at least one other non-translational degree of freedom;

a single non-rotationally symmetric fiducial mark having at least one precise dimension placed on the object at a predetermined location on the object and at a predetermined angular orientation with respect to the object;

a fixture for maintaining a fixed translational and angular relationship between the object and the fixture frame of reference, the camera being stationary with respect to the fixture frame of reference;

a search system that uses the vision tool to find the fiducial mark in the image so as to determine its location and angular orientation with respect to the image frame of reference; and a calibration system that uses the fixed relationship maintained by the fixture, and the location and angular orientation of the fiducial mark determined by the search system, to calibrate the image acquisition system so as to determine a relationship between measurements and coordinates in the image frame of reference with measurements and coordinates in the fixture frame of reference.

* * * * *